(12) United States Patent
Shindo et al.

(10) Patent No.: US 6,693,665 B1
(45) Date of Patent: Feb. 17, 2004

(54) SYSTEM AND APPARATUS FOR FACILITATING PRINTING OF IMAGES FROM AN ELECTRONIC CAMERA

(75) Inventors: Mitsuyoshi Shindo, Kanagawa (JP); Hideki Wanami, Kanagawa (JP); Hikaru Kobayashi, Kanagawa (JP); Kiyotaka Dochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/353,686

(22) Filed: Jul. 14, 1999

(30) Foreign Application Priority Data

Jul. 17, 1998  (JP) .......................... P10-202547

(51) Int. Cl.[7] .............................. H04N 5/225
(52) U.S. Cl. ................ 348/207.2; 348/207.1; 348/375
(58) Field of Search .................. 748/207.99, 207.1, 748/207.11, 207.2, 222.1, 220.1, 374, 375, 376, 211.99, 211.1, 211.4, 211.14, 250/208.1; 400/2; 347/171, 172; 358/1.1

(56) References Cited

U.S. PATENT DOCUMENTS

| | | | | |
|---|---|---|---|---|
| 4,937,676 A | * | 6/1990 | Finelli et al. | ................ 348/375 |
| 5,588,732 A | | 12/1996 | Sasaki et al. | |
| 5,917,545 A | * | 6/1999 | Kowno et al. | ........... 348/231.9 |
| 6,111,604 A | * | 8/2000 | Hashimoto et al. | ...... 348/220.1 |
| 6,115,137 A | * | 9/2000 | Ozawa et al. | ................ 358/1.6 |

FOREIGN PATENT DOCUMENTS

| | | | |
|---|---|---|---|
| DE | 19645716 | 5/1997 | |
| EP | 0382044 A | 8/1990 | |
| EP | 0422447 A2 | 4/1991 | |
| EP | 09069970 | 3/1997 | |
| EP | 09130659 | 5/1997 | |
| JP | 02309875 | 12/1990 | |
| JP | 06253189 | 9/1994 | |
| JP | 408251526 A * | 9/1996 | ............ H04N/5/76 |
| JP | 10058727 | 3/1998 | |
| JP | 411155120 A * | 6/1999 | ............ H04N/5/76 |

* cited by examiner

Primary Examiner—Tuan Ho
(74) Attorney, Agent, or Firm—Reed Smith Crosby Heafey LLP (57) ABSTRACT

A photographic apparatus is described which outputs a photographed image immediately to paper by a simple operation. The photographic apparatus includes an electronic camera for electronically acquiring an image, a connection base for removably connecting the electronic camera thereto, the connection base having a function of reading out image data from the electronic camera while the camera is connected thereto, and a printing section for acquiring the image data from the connection base and outputting an image based on the image data to paper.

11 Claims, 11 Drawing Sheets

SYSTEM AND APPARATUS FOR FACILITATING PRINTING OF IMAGES FROM AN ELECTRONIC CAMERA

BACKGROUND OF THE INVENTION

1. Field of the Invention

This invention relates to a photographic apparatus for outputting an image photographed using an electronic camera such as a digital camera to paper.

2. Related Prior Art

In recent years, a solid state imaging apparatus which makes use of a CCD unit has exhibited remarkable increase in resolution and storage capacity, and efforts are directed to development of an electronic apparatus for electronically fetching an image such as an electronic still camera or a digital video recorder.

In such a situation as described above, the electronic still camera exhibits such improvement that it is as good as that using silver salt film, and the electronic still camera is utilized not only for general use but also for professional use thanks to a data holding property and facility in after-processing in addition to the improved definition.

However, when an image is electronically fetched using such an electronic camera as described above, in order to output the image to paper, it is necessary to start up a computer to which a printer is connected and transfer the image data to the printer through the computer. Thus, the electronic camera has a problem in that, in order to output image data to paper, a computer must be started up in this manner, and the image data cannot be outputted immediately.

Further, in order to allow image data to be outputted directly to paper without intervention of a computer, it has been proposed to provide an electronic camera with a printer controlling function or to provide a printer with a functions of fetching image data from an electronic camera.

However, provision of an electronic camera with a function of controlling a printer not only disturbs miniaturization or ease of use of an electronic camera but also invites an increase in cost. On the other hand, if a printer is provided with a function of fetching image data from an electronic camera, then an increase in cost of the printer itself is invited.

Further, since an electronic camera and a printer are connected to each other by a cable, each time it is intended to perform outputting to paper, connection and disconnection of the cable must be performed. Thus, cumbersome operation is required.

SUMMARY OF THE INVENTION

It is an object of the present invention to provide a photographic apparatus which can output a photographed image immediately to paper by a simple operation.

In order to attain the object described above, according to the present invention, there is provided a photographic apparatus, including an electronic camera for electronically acquiring an image, a connection base for removably connecting the electronic camera thereto, the connection base having a function of reading out image data from the electronic camera while the camera is connected thereto, and printing means for acquiring the image data from the connection base and outputting an image based on the image data to paper.

In the photographic apparatus, the electronic camera is removably connected to the connection base, and image data read out from the electronic camera is acquired by the printing means through the connection base and outputted to paper by the printing means. Consequently, when photographing is to be performed, the electronic camera can be removed from the connection base to acquire an image, but when the acquired image is to be outputted to paper, the electronic camera can be connected to the connection base to establish electric connection between the electronic camera and the printing means to allow the printing means to perform such outputting of the image data to paper.

Consequently, the photographic apparatus is advantageous in that an image photographed by the electronic camera can be outputted to paper without using a computer and can be outputted immediately after it is photographed. The photographic apparatus is advantageous also in that, since transfer or image processing of image data acquired by the connection base is performed, there is no necessity to provide such functions to the electronic camera or the printing means, and consequently, simplification and reduction in cost of the electronic camera and the printing means can be achieved.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 1:
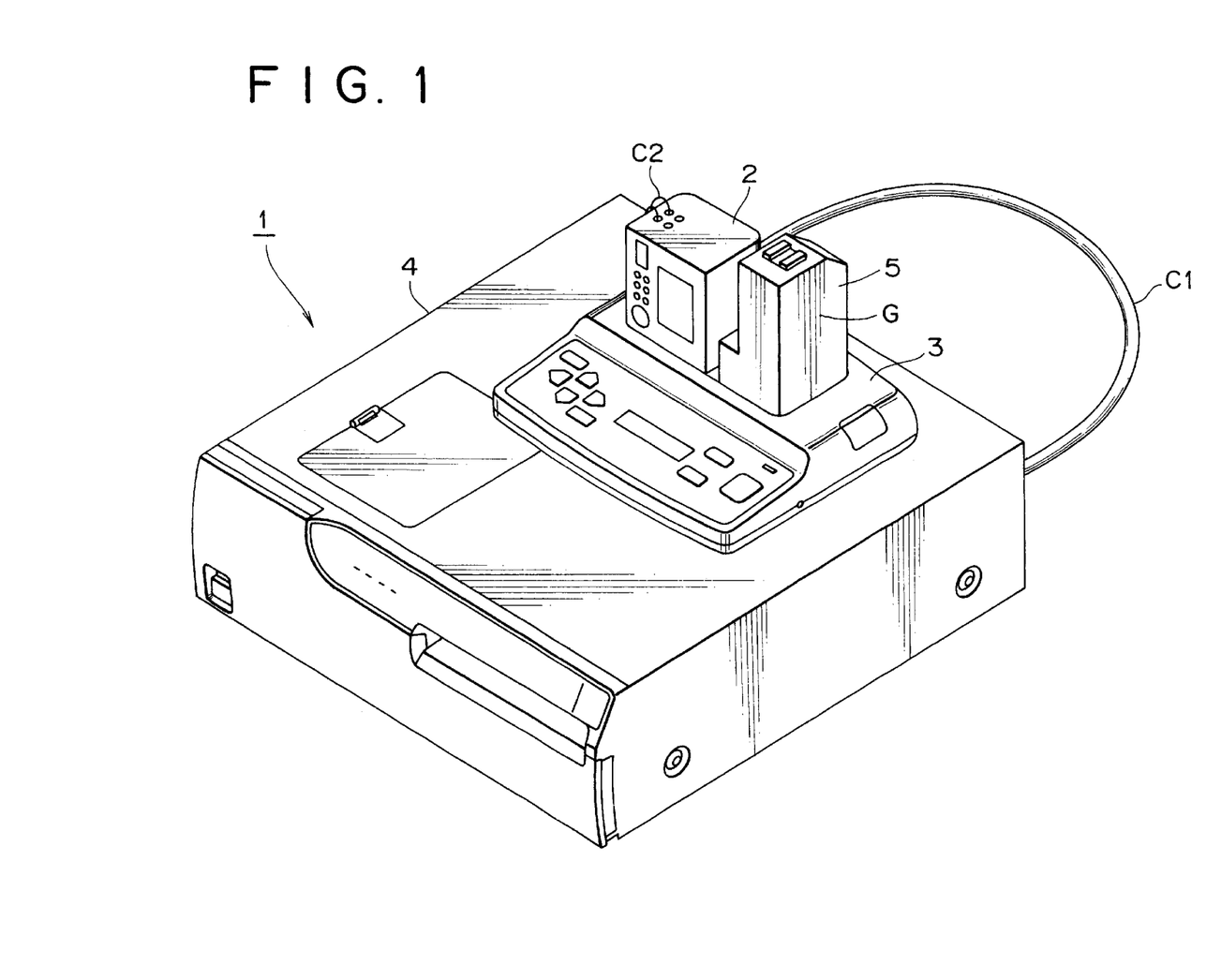
FIG. 1 is a perspective view showing an appearance of a photographing apparatus to which the present invention is applied.

Referring first to FIG. 1, there is shown a photographing or photographic apparatus to which the present invention is applied. The photographing apparatus is generally denoted at 1 and includes, as principal components thereof, an electronic camera 2 in the form of a digital still camera, a connection base 3 for removably receiving the electronic camera 2, and a printing section 4 for acquiring image data from the electronic camera 2 through the connection base 3 and outputting an image based on the image data to paper.

The electronic camera 2 is connected to an adapter 5 which includes a grip G for being gripped by a user of the electronic camera 2, and is mounted on the connection base 3 together with the adapter 5. The connection base 3 and the printing section 4 are electrically connected to each other by a cable C1 so that image data received by the electronic camera 2 can be transferred to the printing section 4 through the connection base 3 and the cable C1. It is to be noted that, while the connection base 3 in FIG. 1 is shown placed on the printing section 4, the connection base 3 may be placed at any location where it is easy for the user to use the electronic camera 2.

If the adapter 5 and the electronic camera 2 are mounted onto the connection base 3, then terminals (not shown) provided on the connection base 3 and terminals (not shown) provided on the adapter 5 are brought into contact with each other to establish electric connection between the connection base 3 and the adapter 5 without the necessity for any independent wiring line.

The connection base 3 has a function of loading image data from the electronic camera 2, image processing functions (decompression of compression data, variation of the image size, color tone adjustment, instruction of variation between white and black and so forth), a controlling function for the printing section 4 (data transfer to the printing section 4, setting of a divisional printing mode, printing control and so forth), and a function of charging a battery for the electronic camera 2.

Figure 2:
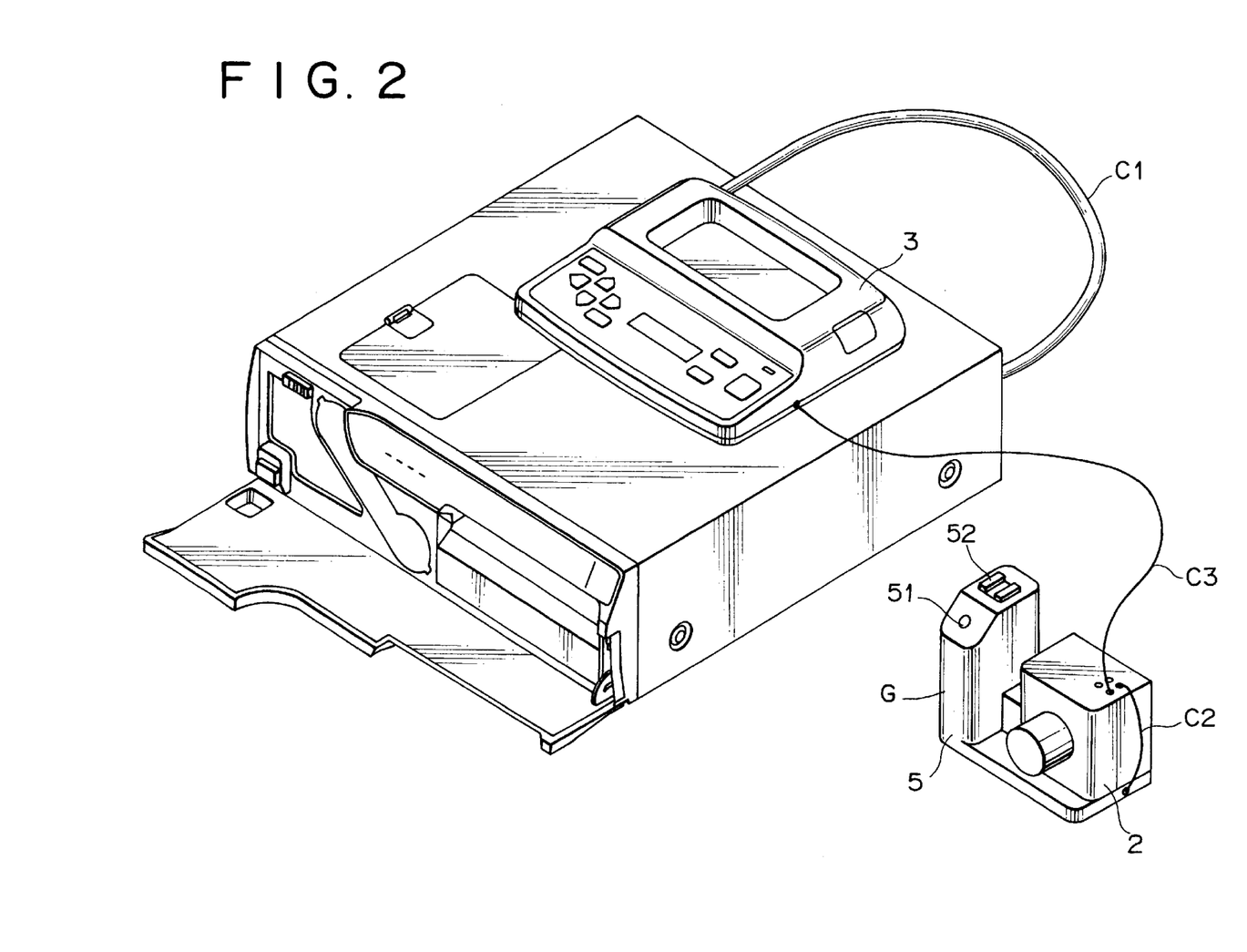
FIG. 2 is a perspective view showing an electronic camera of the photographing apparatus of FIG. 1 removed from a connection base.

FIG. 2 shows the electronic camera 2 in a condition wherein it is removed from the 15 connection base 3. In particular, when photographing is to be performed or in some other case, the user will remove the electronic camera 2 from the connection base 3 together with the adapter 5 and grip the grip G of the adapter 5 to acquire an image of an imaging object using the electronic camera 2. It is to be noted that, while the electronic camera 2 and the connection base 3 are shown connected to each other by a cable C3 in FIG. 2, if only photographing is performed, then no such connection is required.

A shutter button 51 to be used for a shutter releasing operation of the electronic camera 2 is provided on the grip G of the adapter 5 so that photographing can be performed while the electronic camera 2 is held with certainty by the user. Further, a flash shoe 52 is provided on the adapter 5 so that a flash apparatus (not shown) as a separate member may be attached to the adapter 5. A female thread (not shown) for mounting a tripod on the adapter 5 is formed in a lower wall of the adapter 5.

A battery for the electronic camera 2 is accommodated, for example, in the grip G of the adapter 5 so that, when the adapter 5 is mounted on the connection base 3, the battery is charged automatically from the connection base 3.

The electronic camera 2 and the adapter 5 are secured to each other, for example, by means of screws, and the shutter button 51 and the flash shoe 52 of the adapter 5 and the electronic camera 2 are synchronized with each other over a cable C2.

The electronic camera 2 and the connection base 3 can be connected to each other by the cable C3 so that, for example, when the adapter 5 is attached to a tripod and photographing is performed with the position of the electronic camera 2 fixed, image data can be transferred from the electronic camera 2 at the position to the connection base 3 over the cable C3.

It is to be noted that, even if the electronic camera 2 and the connection base 3 are not connected to each other by the cable C3, if the electronic camera 2 is mounted onto the connection base 3 together with the adapter 5 after photographing is completed, then electric connection is still established so that image data stored in the electronic camera 2 can be transferred in response to an instruction from the connection base 3.

Figure 3A:
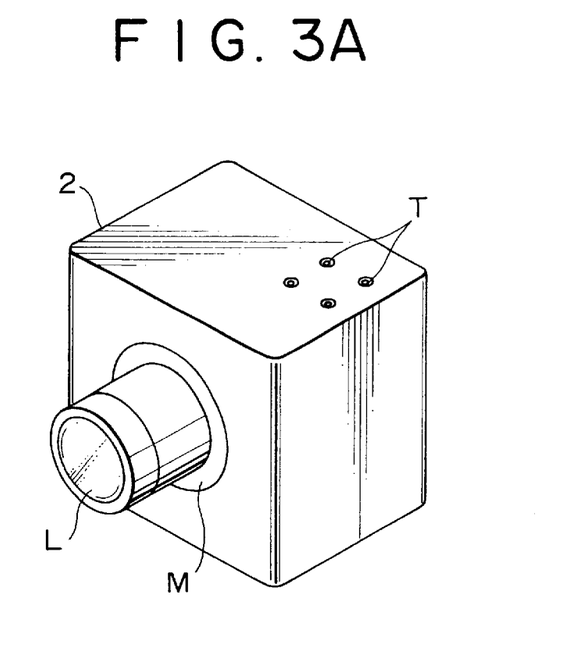
FIGS. 3A and 3B are perspective views of the electronic camera shown in FIG. 2 as viewed from the front side and the rear side, respectively.
Figure 3B:
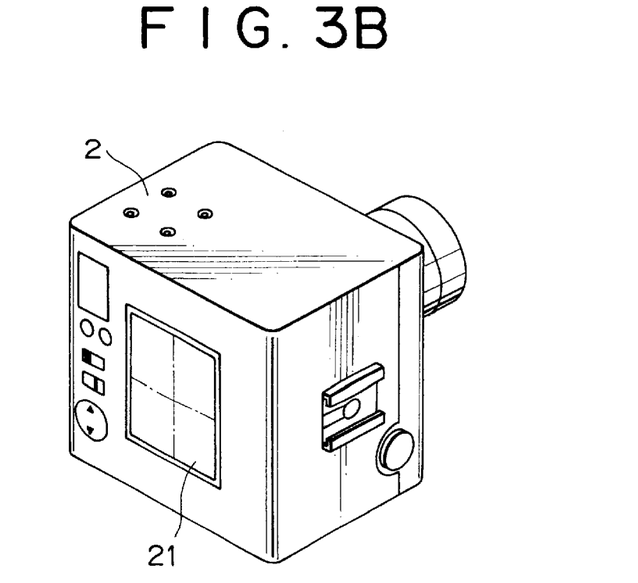

Referring now to FIGS. 3A and 3B, the electronic camera 2 is shown in perspective views as viewed from the front side and the rear side, respectively. The electronic camera 2 uses a CCD unit (not shown) to fetch image data of an imaging object and stores the image data into an internal memory. In particular, the electronic camera 2 can fetch an image through a lens L. The lens L is mounted on a mount M which matches with the C mount, and can be exchanged as required.

A plurality of connection terminals T are provided on an upper wall of the electronic camera 2 so that the electronic camera 2 can be connected to the adapter 5 (refer to FIG. 1) or the connection base 3 (refer to FIG. 2) therethrough by means of a cable.

A display unit 21 of the liquid crystal type is provided on a rear wall of the electronic camera 2 so that an image viewed for photographing or an image already taken and stored can be displayed to allow the user to confirm a photographing condition. It is to be noted that an image to be displayed on the display unit 21 may be displayed on an external display unit (not shown) connected to the connection terminals T.

Further, the electronic camera 2 has an interface (RS-232C, SCSI, IEEE 1394 or the like) for transferring fetched image data therethrough.

Figure 4:
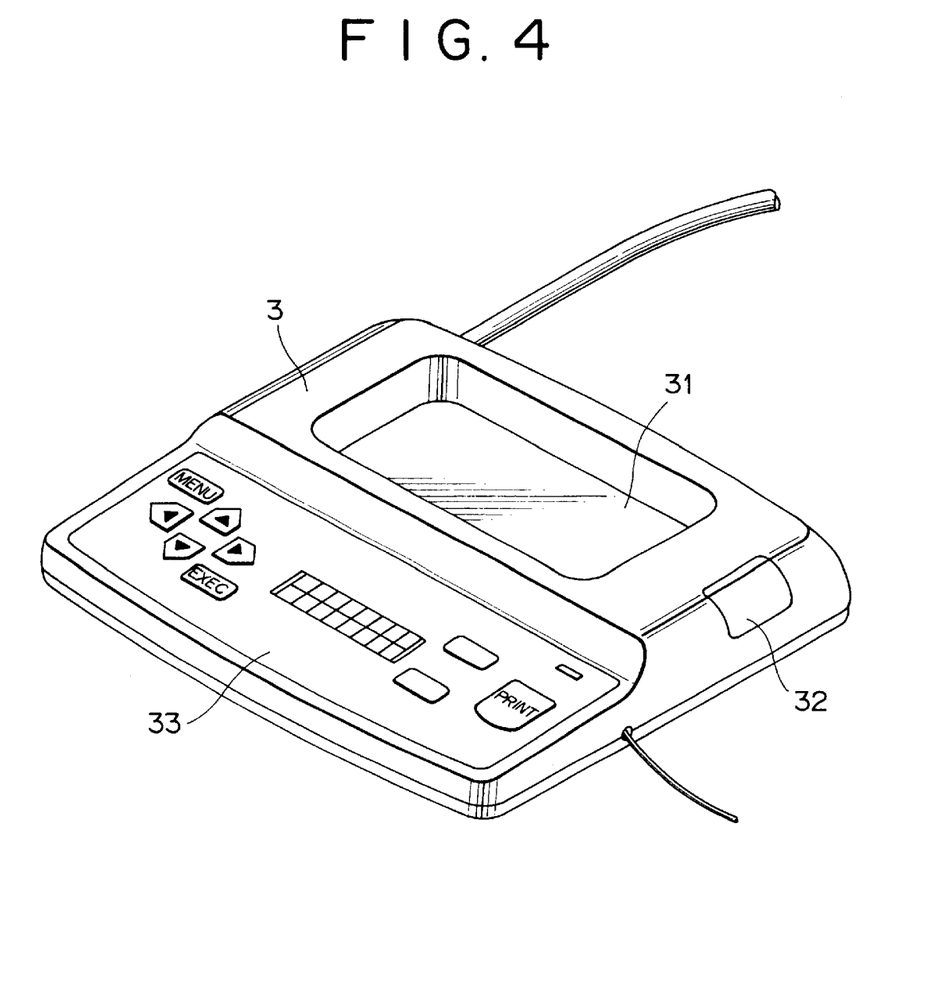
FIG. 4 is a perspective view showing the connection base shown in FIG. 2.

FIG. 4 shows the connection base 3. The connection base 3 has a recess 31 provided on the top thereof so that the adapter 5 (refer to FIG. 1) on which the electronic camera 2 (refer to FIG. 1) is mounted can be received thereon.

When the adapter 5 (refer to FIG. 1) is received in the recess 31, it is fixed to the recess 31 by means of pawls (not shown) provided in the recess 31. A button 32 for releasing the adapter 5 thus fixed by the pawls is provided on the connection base 3.

Figure 5:
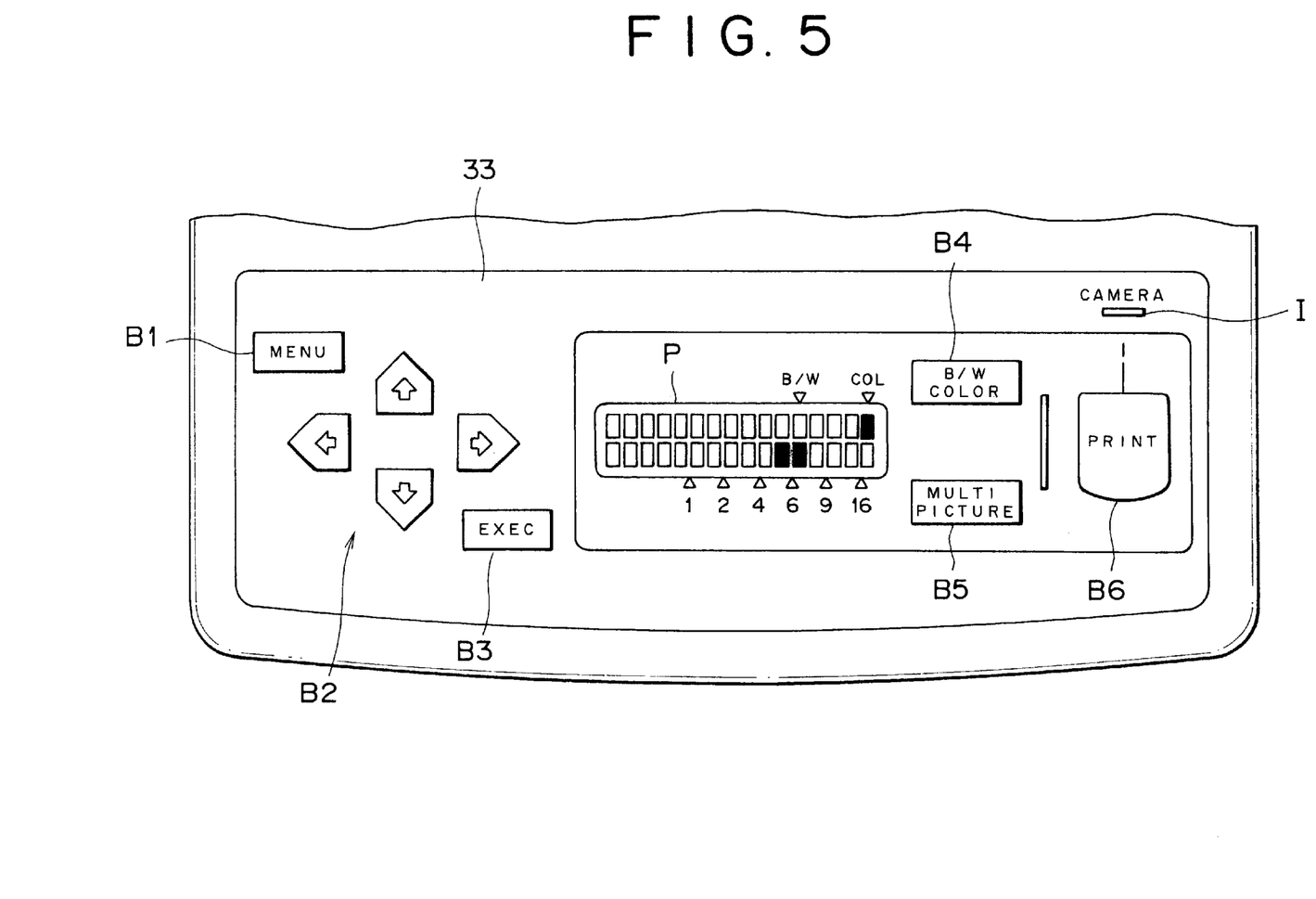
FIG. 5 is a plan view showing an inputting/outputting section of the connection base of FIG. 4.

Further, an inputting/outputting section 33 for inputting various setting information therethrough and displaying various setting conditions thereon is provided on the connection base 3. FIG. 5 shows details of the inputting/outputting section 33.

The inputting/outputting section 33 includes buttons (keys) for inputting various setting information therethrough and a display panel for displaying a setting condition thereon. The inputting buttons include a menu button B1 for selecting a menu, arrow mark buttons B2 for selecting or changing setting instructions, a determination button B3 for determining an inputted instruction, a button B4 for designating a white/black mode, a button B5 for designating divisional printing, and a printing button B6 for executing printing. Further, as the display, a liquid crystal panel P is provided.

When the photographing apparatus 1 is in a state in which printing is possible, the liquid crystal panel P provides a two-stage display wherein printing setting of a white/black mode or a color mode is displayed on the upper stage while a divisional setting number is displayed on the lower stage. Further, if the menu button B1 is depressed, then a setting menu is displayed in the form of characters on the liquid crystal panel P. The user will operate the character display with the arrow mark buttons B2 to select a desired menu, and when the selection is to be determined, the determination button B3 will be depressed.

Further, an indicator I formed from a lamp is provided on the inputting/outputting section 33. The indicator I indicates whether or not image data is being transferred from the electronic camera 2 (refer to FIG. 1). For example, while transfer of image data from the electronic camera 2 is proceeding, the indicator I is lit, but while transfer of image data is not proceeding, the indicator I is not lit. When the indicator I is not lit (when transfer of image data is not proceeding), the electronic camera 2 can be removed from the connection base 3.

Figure 6A:
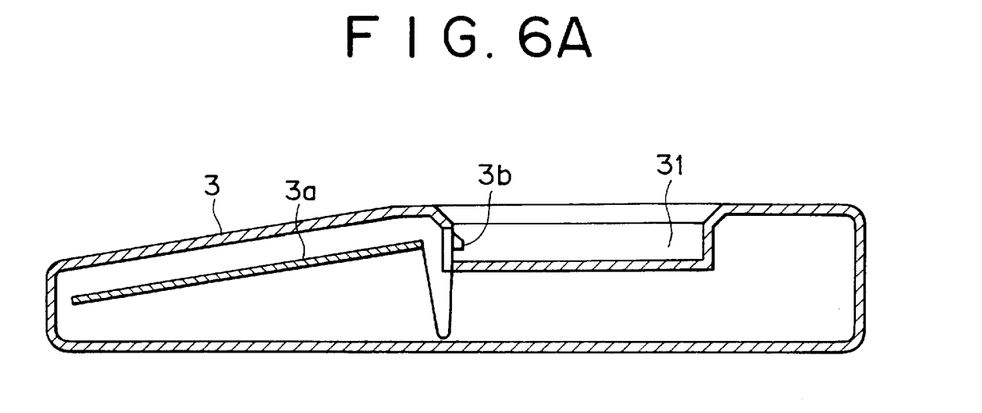
FIGS. 6A and 6B are schematic sectional views of the connection base of FIG. 4 taken along different lines.
Figure 6B:
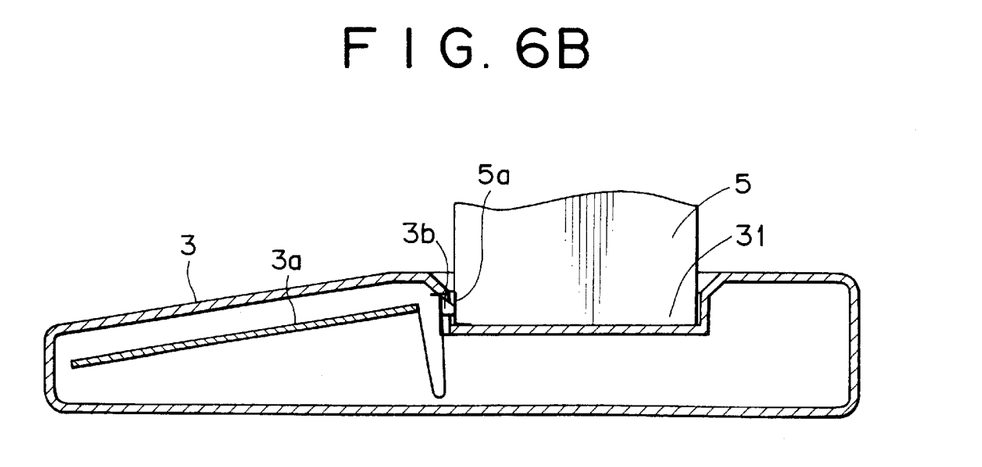

FIGS. 6A and 6B show cross sections of the connection base 3. In particular, a board 3a on which a circuit is formed is accommodated in the connection base 3 as shown in FIG. 6A, and one end side of each of contact pins 3b is connected to the board 3a. The contact pins 3b are disposed such that the other end sides of the contact pins 3b project from an inner wall of the recess 31.

If the adapter 5 is fitted into the recess 31 of the connection base 3 as shown in FIG. 6B, then contacts 5a of the adapter 5 and the other ends of the contact pins 3b are brought into contact with each other. Consequently, image data acquired by the electronic camera 2 (refer to FIG. 1) can be sent from the contacts 5a of the adapter 5 to the board 3a of the connection base 3 through the contact pins 3b.

Figure 7:
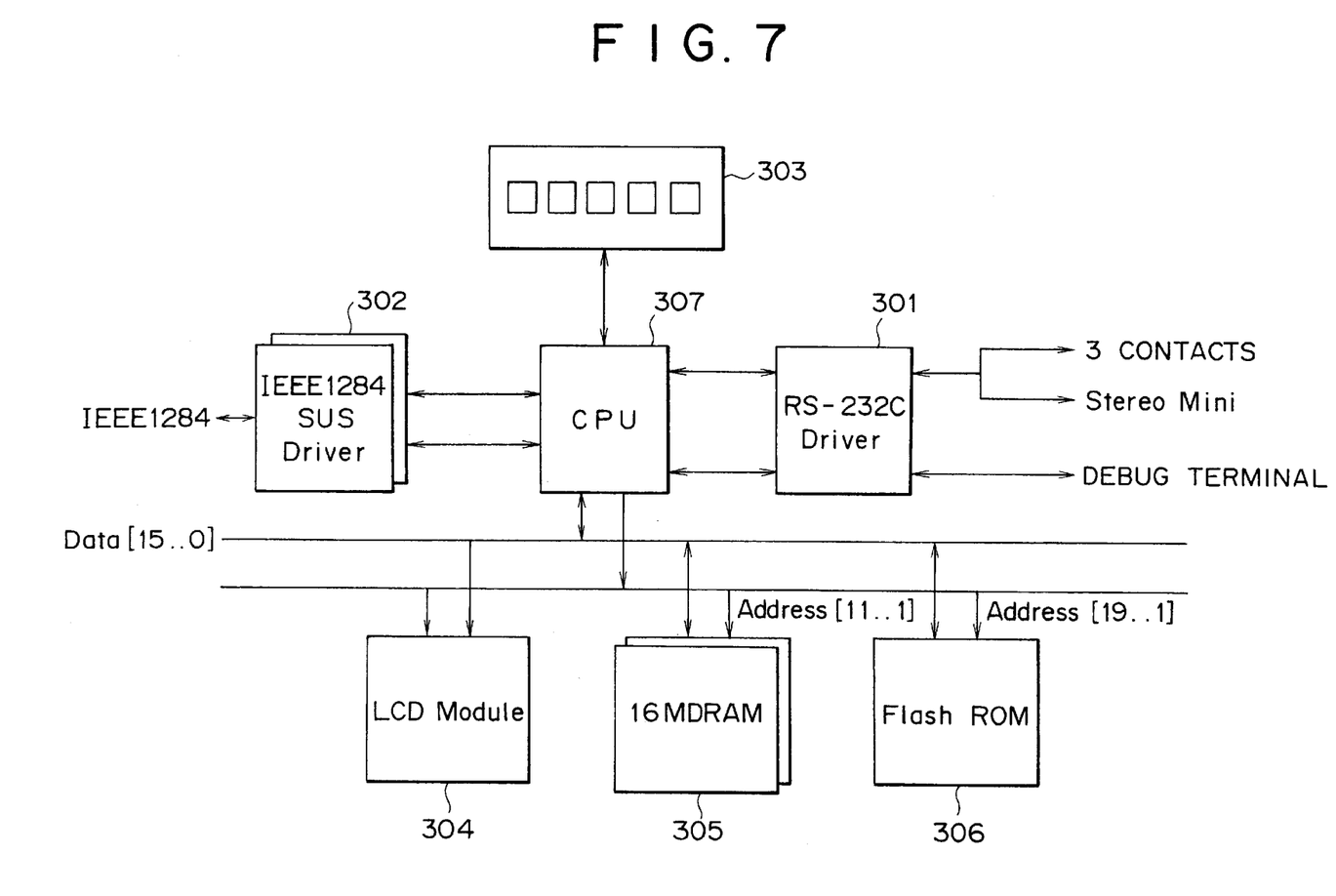
FIG. 7 is a block diagram showing an internal construction of the connection base of FIG. 4.

FIG. 7 shows an internal construction of the connection base 3. Referring to FIG. 7, the connection base 3 includes an interface driver 301 (for example, RS-232C) with the electronic camera 2, another interface driver 302 (for example, IEEE 1284) with the printing section 4, a button-LED section 303 including inputting buttons and indicating LEDs, an LCD module 304, a DRAM 305, a flash ROM 306, and a CPU 307. The CPU 307 and the other components are connected to each other over a data bus and an address bus.

In the connection base 3 having such a construction as described above, an image data transferring instruction is provided to the electronic camera 2 through the interface driver 301 which matches with, for example, the RS-232C. Meanwhile, image data transferred from the electronic camera 2 is acquired through the interface driver 301 and cumulatively stored once into the DRAM 305.

The image data stored in the DRAM 305 is read out in response to a request from the printing section and transferred to the printing section over the interface driver 302 which matches, for example, the IEEE 1284.

Figure 8:
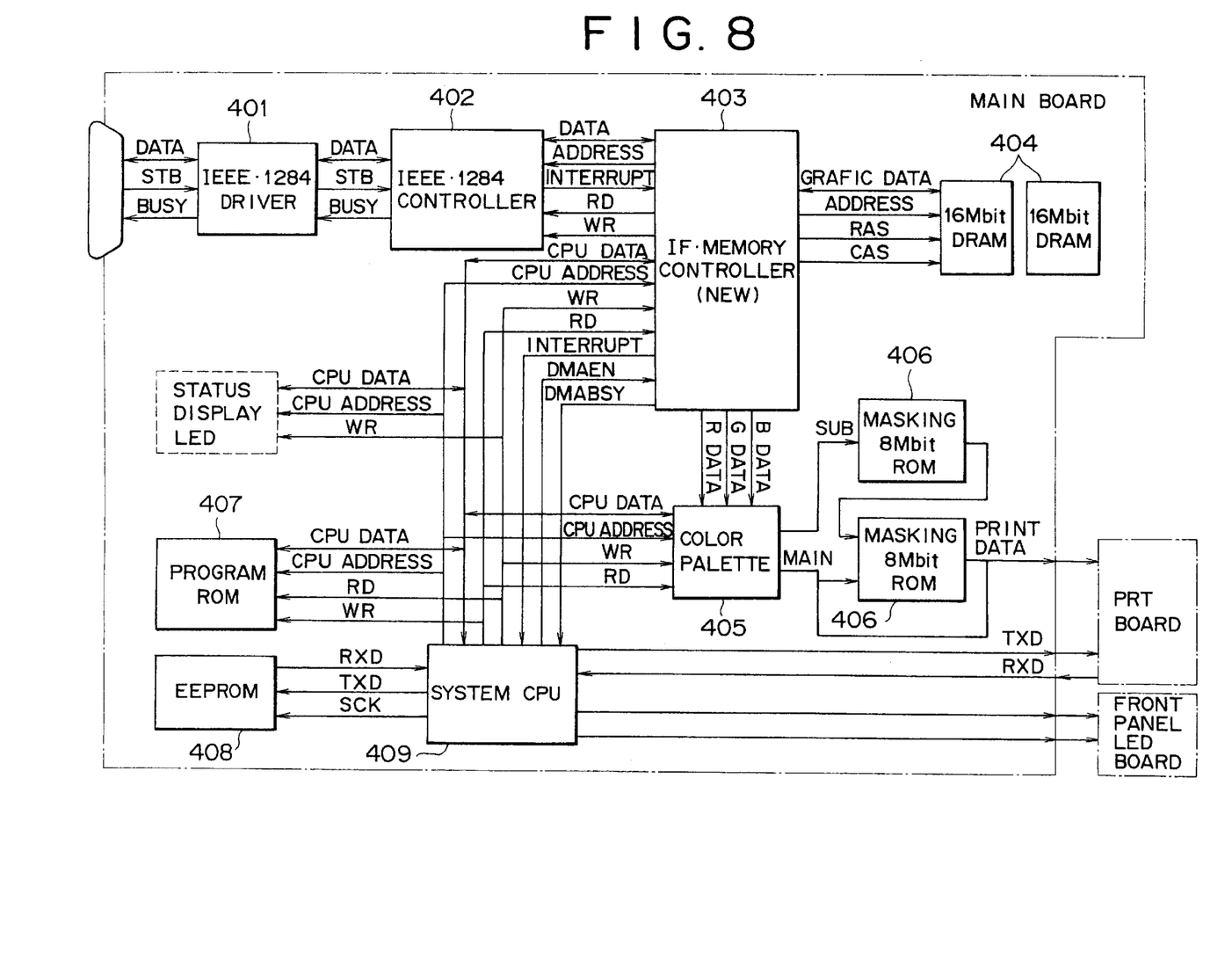
FIG. 8 is a block diagram showing an internal construction of a printing section shown in FIG. 1.

FIG. 8 shows an internal construction of the printing section 4. In particular, the printing section 4 includes, as principal components thereof, an interface driver 401, an interface controller 402, a memory controller 403, a DRAM 404, a color pallet 405, a masking ROM 406, a program ROM 407, an EEPROM 408, and a system CPU 409.

Image data outputted from the connection base 3 side is read into the printing section 4 through the interface driver 401, which matches with a predetermined interface (for example, the RS-232C, SCSI, IEEE 1284 or IEEE 1394), and the interface controller 402, and is stored into the DRAM 404 under the control of the memory controller 403.

When outputting of image data to paper is to be performed, image data (for example, R, G, B data) read out from the DRAM 404 under the control of the memory controller 403 is converted into data for printing (for example, C, M, Y data) through the color pallet 405 and is outputted to a print board (PRT BOARD) through the masking ROM 406.

Subsequently, a photographing procedure using the photographing apparatus of the present embodiment is described. First, the user removes the adapter 5 and the electronic camera 2 from the connection base 3 shown in FIG. 1. Such removal can be preformed by a single operation of depressing the button 32 shown in FIG. 4.

Figure 9:
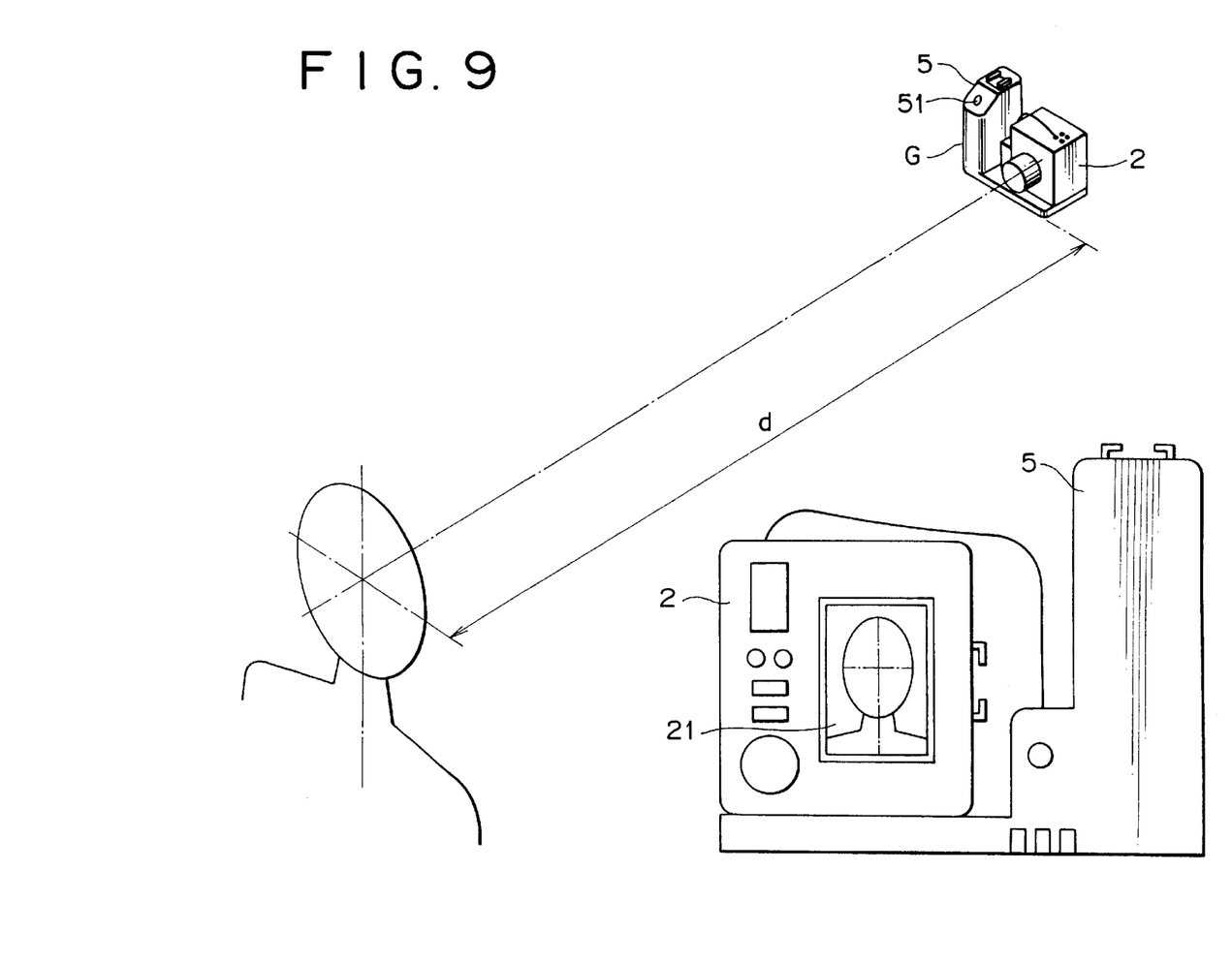
FIG. 9 is a schematic view illustrating a manner in which a photograph for certificate is taken.

Then, the user will grasp the grip G of the adapter 5 and perform photographing of an image object using the electronic camera 2. FIG. 9 schematically illustrates a manner in which a photograph for certificate is taken. In this instance, the electronic camera 2 is located at a position spaced by a distance d (for example, approximately 1.5 m) from a person acting as an image object. In this instance, a tripod may be attached to the adapter 5 to fix the position of the electronic camera 2.

Here, where the electronic camera 2 is of the manual focus and manual diaphragm type, in photographing in a flashlight emitting mode, first the diaphragm is kept open so that focusing may be performed readily, and then, after focusing is completed, the diaphragm is adjusted manually in accordance with a required flashlight amount immediately prior to release of the shutter.

Since the display unit 21 is provided on the rear wall of the electronic camera 2, an image of the imaging object displayed on the display unit 21 can be visually observed by the user, and the focusing described above is performed by the user referring to the displayed image. Further, an automatic exposure adjustment mechanism (AE) operates till an instant at which the shutter is released, and consequently, the display on the display unit 21 does not become dark upon focusing.

It is to be noted that, where the electronic camera 2 is of the type wherein the diaphragm operates in association with the shutter, no manual diaphragm operation is required.

After such adjustment as described above is performed, the user will depress the shutter button 51 provided on the grip G of the adapter 5. Alternatively, a shutter operation may be performed using an infrared remote controller or a timer may be used to perform a shutter operation after lapse of a predetermined time.

In response to the depression of the shutter button 51, an image of the imaging object is fetched into the electronic camera 2 and stored into the internal memory of the electronic camera 2.

The image stored in the memory can be displayed on the display unit 21 (refer to FIG. 3) in response to a key operation of the electronic camera 2 and consequently can be confirmed by the user. It is to be noted that this operation may be performed alternatively by an operation of a button of the connection base 3 side with the electronic camera 2 mounted on the connection base 3.

Then, printing of the photographed image is performed. In order to perform such printing, one of the images cumulatively stored in the memory which is to be printed is selected. This selection may be performed by an operation of a key of the electronic camera 2 or by an operation of a button on the connection base 3 side after the electronic camera 2 is mounted onto the connection base 3. It is to be noted that mounting of the electronic camera 2 onto the connection base 3 can be preformed by a single operation of placing and pushing the electronic camera 2 (with the adapter 5 attached thereto) into the recess 31 (refer to FIG. 4) of the connection base 3.

After an image to-be printed is selected, selection of a mode in which printing is to be performed (a divisional number, a color or white/black) and setting of a color tone, a sharpness degree and so forth) is performed by operations of the buttons of the connection base 3, and then the printing button B6 (refer to FIG. 5) is depressed.

When the printing button B6 (refer to FIG. 5) is depressed, a command is sent from the connection base 3 to the electronic camera 2, and image data to be printed is read out from the memory of the electronic camera 2.

Image data stored in the memory of the electronic camera 2 is compressed data (for example, JPEG compression). Thus, the image data read out is decompressed by the connection base 3 and stored into the built-in DRAM 305 (refer to FIG. 7).

Thereafter, the connection base 3 performs image processing in accordance with the contents of adjustment set in advance (a color tone, a sharpness degree and so forth), a divisional number, and selection of a color mode or a white/black mode, and transfers image data obtained by the processing to the printing section 4 (refer to FIG. 1). It is to be noted that part of such image processing may be performed by the printing section 4 side by providing such instruction from the connection base 3 to the printing section 4.

After the image data is transferred to the connection base 3, the electronic camera 2 can be removed from the connection base 3 to perform some other photographing even before the printing is completed. The timing at which the electronic camera 2 can be removed can be conveyed to the user by a display of the indicator I (refer to FIG. 5) provided on the connection base 3.

The printing section 4 (refer to FIG. 1) to which the image data has been transferred can perform printing processing to paper based on the image data.

Figure 10:
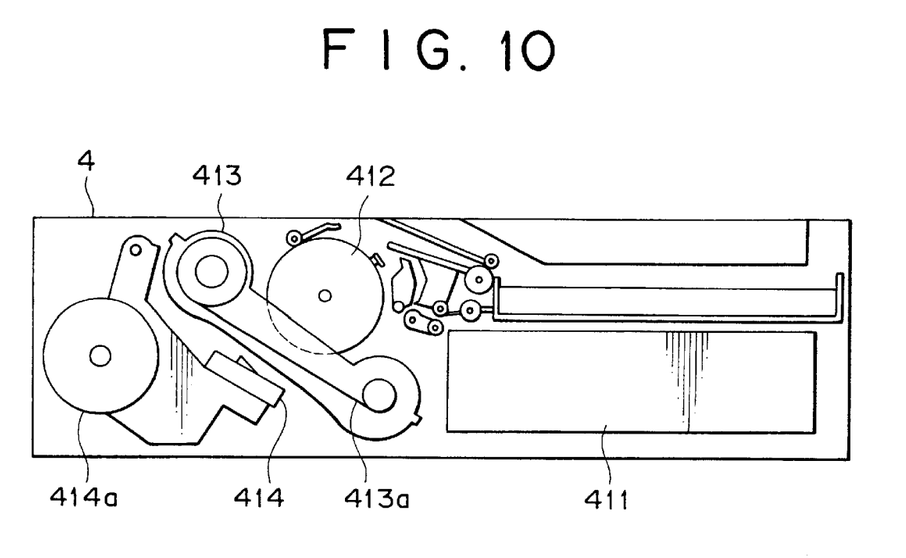
FIGS. 10, 11, 12, and 13 are schematic sectional views illustrating different stages of printing operation of the printing section shown in FIG. 1.

Here, a printing operation of the printing section 4 is described with reference to cross sectional views of FIGS. 10 to 13. The printing section 4 may be a thermal sublimation type printer and includes, as principal components thereof, a paper tray 411, a platen 412, a ribbon cartridge 413, a head 414 and a head motor 414a as shown in FIG. 10. In the stage of preparation for printing, the head 414 stands by at a position spaced from a ribbon 413a of the ribbon cartridge 413.

Figure 11:
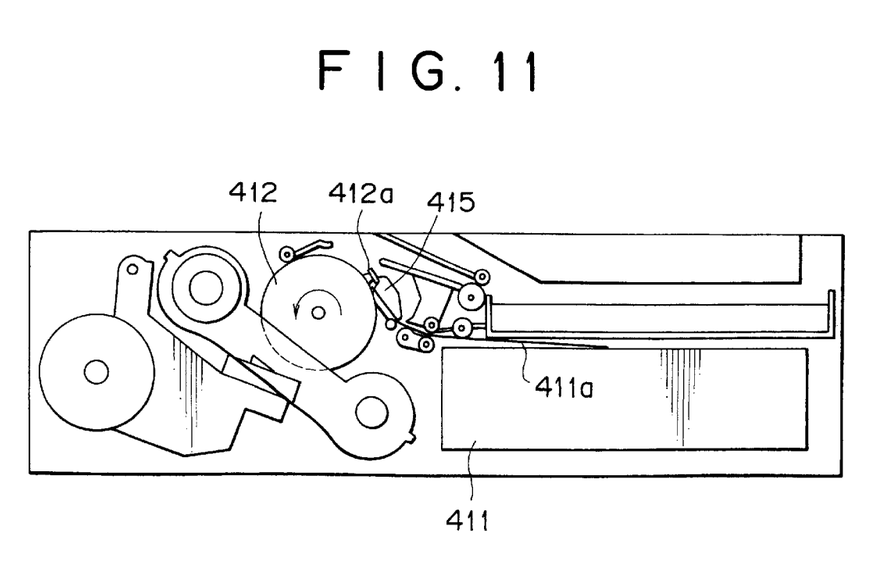

If a printing instruction is sent from the connection base 3 (refer to FIG. 1) and image data is transferred to the printing section 4, then a paper sheet 41 la is supplied from the paper tray 411 and fed to the platen 412 under the guidance of various rollers and a paper guide 415 as seen in FIG. 11. Thereupon, a leading end of the paper sheet 411a is brought into abutment with and held by a chuck 412a of the platen 412. As a result, when the platen 412 rotates, the paper sheet 411 a is wrapped at an accurate position around the platen 412 without being displaced.

Figure 12:
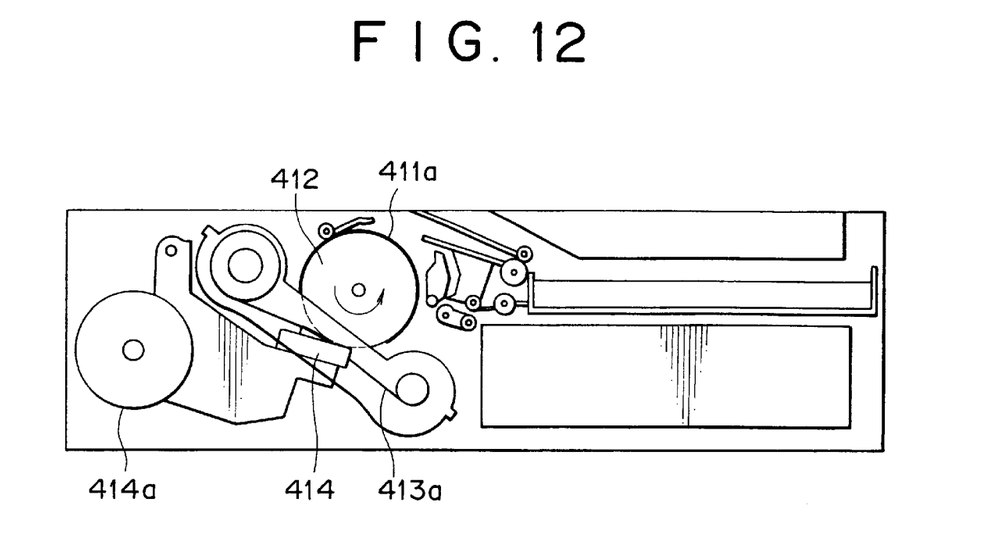

Then, the head 414 is driven by the head motor 414a so that it is brought into a contacting condition with the ribbon 413a as shown in FIG. 12. Then, after the paper sheet 4121a wrapped around and fed by the platen 412 comes to the position of the head 414, the head 414 is driven based on the image data so that ink of the ribbon 413a is successively transferred to the paper sheet 411a.

Figure 13:
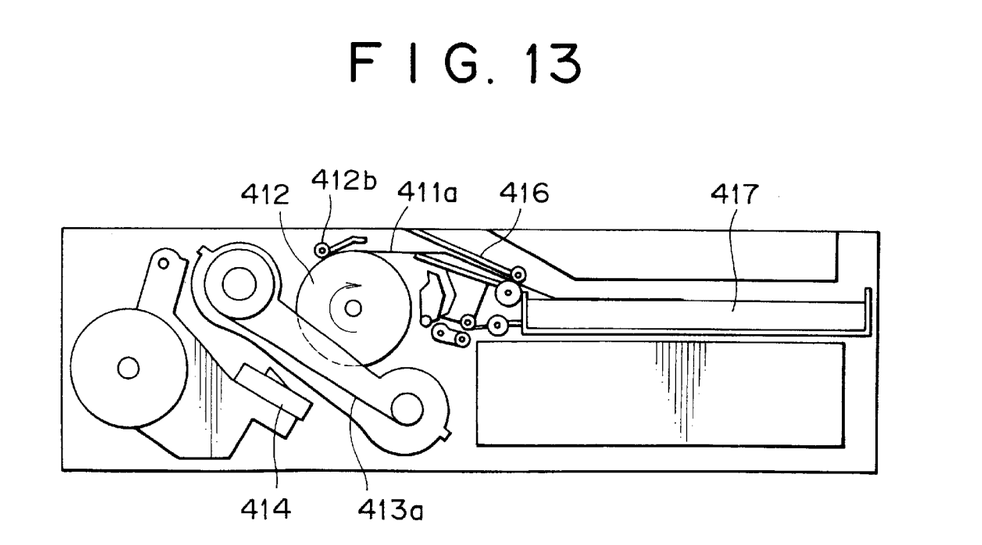

After the platen 412 is rotated until an image based on the image data is formed fully on the paper sheet 411a, the head 414 is brought out of contact with the ribbon 413a and the platen 412 is rotated in the opposite direction as seen in FIG. 13 to its original position.

Then, the paper sheet 411a on which the image is formed is fed along a discharge paper guide 416 while it is pressed down by a hold roller 412b until it is sent into a discharge paper tray 417. The printing of the image onto the paper is completed by such a sequence of operations as described above.

As described above, after an image is acquired by the electronic camera 2, printing of the image onto paper can be performed simply by operation of the connection base 3.

It is to be noted that, while, in the embodiment described above, the electronic camera 2 which principally is in the form of a digital still camera is used, the present invention is not limited to this and can be applied to an electronic camera which alternatively is in the form of a digital video recorder. In this instance, recorded images are reproduced by operation of the connection base 3, and the reproduction is stopped temporarily at an image to be printed. Then, the image data at which the reproduction is stopped is transferred to the printing section 4.

Further, while, in the embodiment described above, electric connection between the electronic camera 2 and the connection base 3 is established by contact between the contact pins 3b (refer to FIG. 6) and the contacts 5a (refer to FIG. 6) or by means of wiring lines of the cable C3 (refer to FIG. 2), data may alternatively be transmitted in a wireless fashion using infrared rays or the like.

While a preferred embodiment of the present invention has been described using specific terms, such description is for illustrative purposes only, and it is to be understood that changes and variations may be made without departing from the spirit or scope of the following claims.

What is claimed is:

1. A photographic apparatus, comprising:

an electronic camera for electronically acquiring an image and providing image data;

a connection base for removably connecting said electronic camera thereto, the connection base having a function of reading out image data from said electronic camera while said camera is connected thereto, wherein the connection base is configured to request that the printer perform image processing on the image data read out from the electronic camera; and a printer for acquiring the image data from said connection base and outputting an image based on the image data to paper.

2. A photographic apparatus according to claim 1, wherein the electronic camera compresses the electronically acquired image and the connection base additionally decompresses compressed image data read out from the electronic camera.

3. A photographic apparatus according to claim 1, wherein the connection base further provides image processing on the image data read out from the electronic camera.

4. A photographic apparatus according to claim 1, wherein the connection base includes inputting and outputting means for inputting setting information and displaying a set state, and control means for controlling image data and the inputting and outputting section.

5. A photographic apparatus according to claim 1, wherein the electronic camera is connected to the connection base through an adapter having a grip.

6. A photographic apparatus according to claim 5, wherein the grip of the adapter has a switch provided thereon for triggering a shutter operation of the electronic camera.

7. A photographic apparatus according to claim 5, wherein the adapter has a battery accommodated therein for supplying power to the electronic camera.

8. A photographic apparatus according to claim 5, wherein the adapter has a flash shoe provided thereon.

9. A photographic apparatus according to claim 1, wherein the printer is a thermal sublimation type printer.

10. A photographic apparatus, comprising:

an electronic camera for electronically providing image data;

a printer for printing an image onto paper;

a connection base formed as a part of the printer for receiving the electronic camera therein; and wherein the connection base reads out image data from the electronic camera while the camera is resides therein and is connected to the connection base and provides the image data to the printer for printing an image, wherein the connection base is configured to request that the printer perform image processing on the image data read out from the electronic camera.

11. A photographic apparatus as in claim 10, wherein the electronic camera may also be connected remotely to the connection base.

* * * * *